Jan. 15, 1957 E. B. NOLT ET AL 2,777,384
TWO-SPOOL NEEDLE-BORNE TIER
Filed March 9, 1953 7 Sheets-Sheet 5

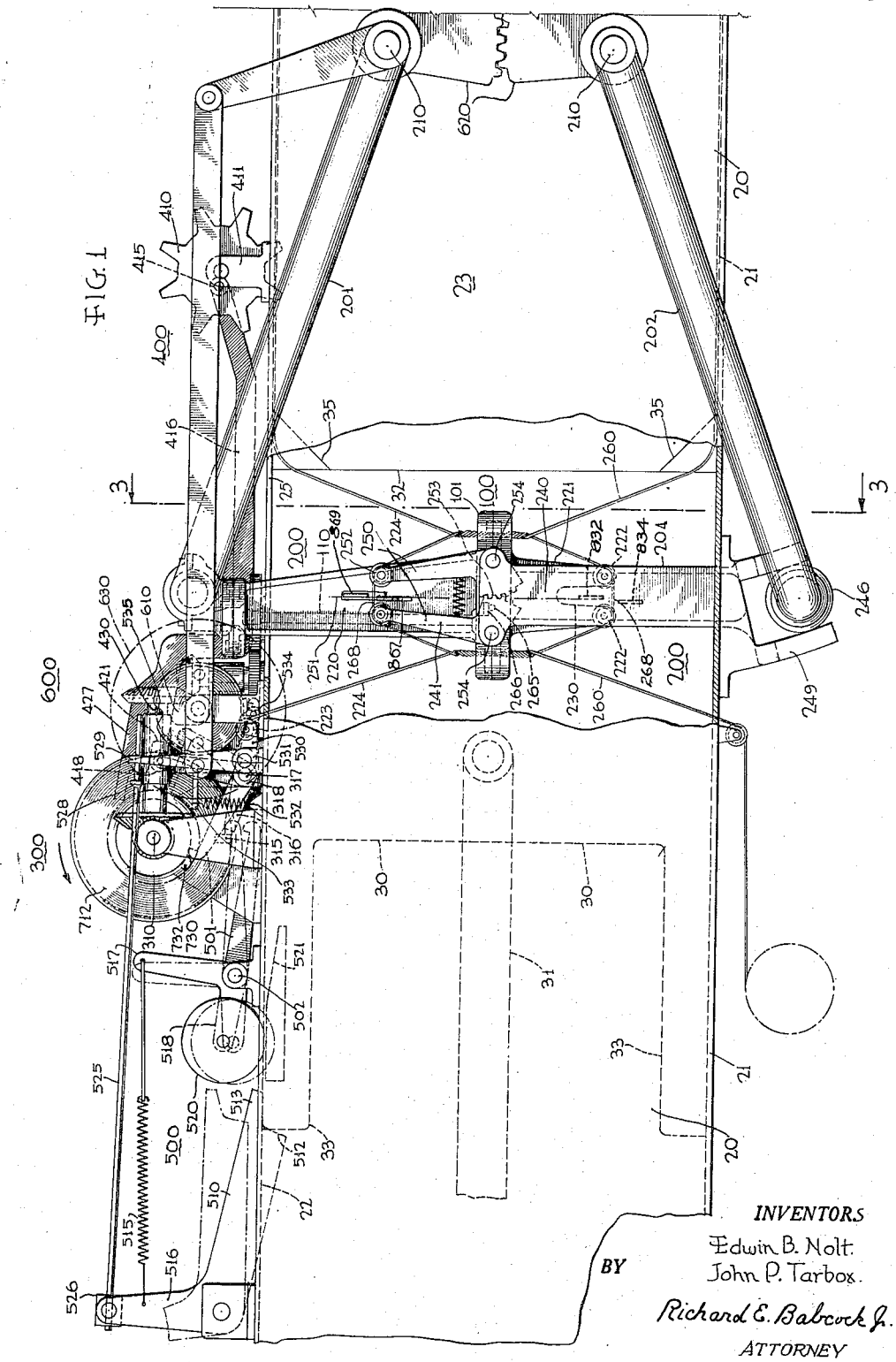

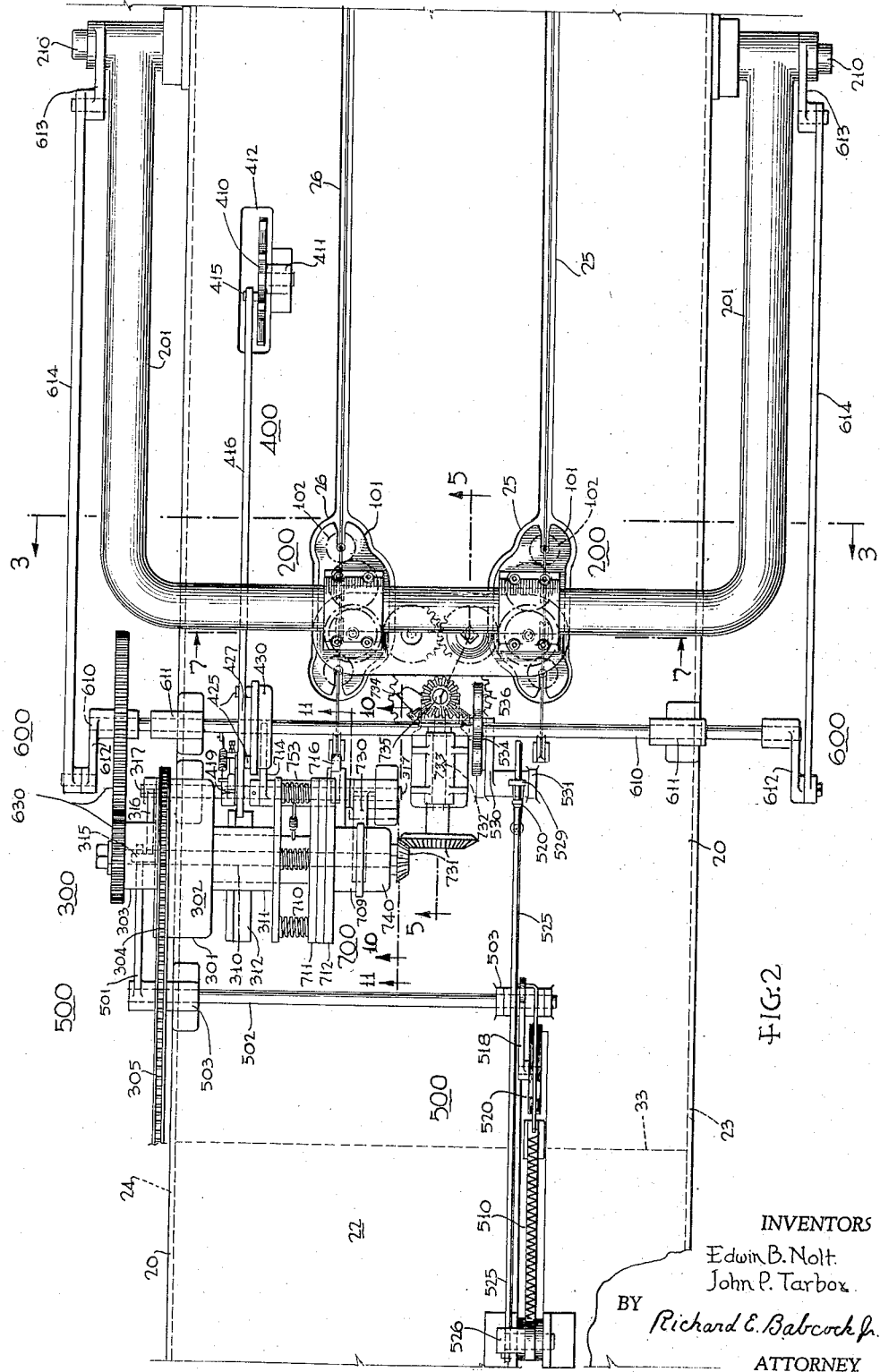

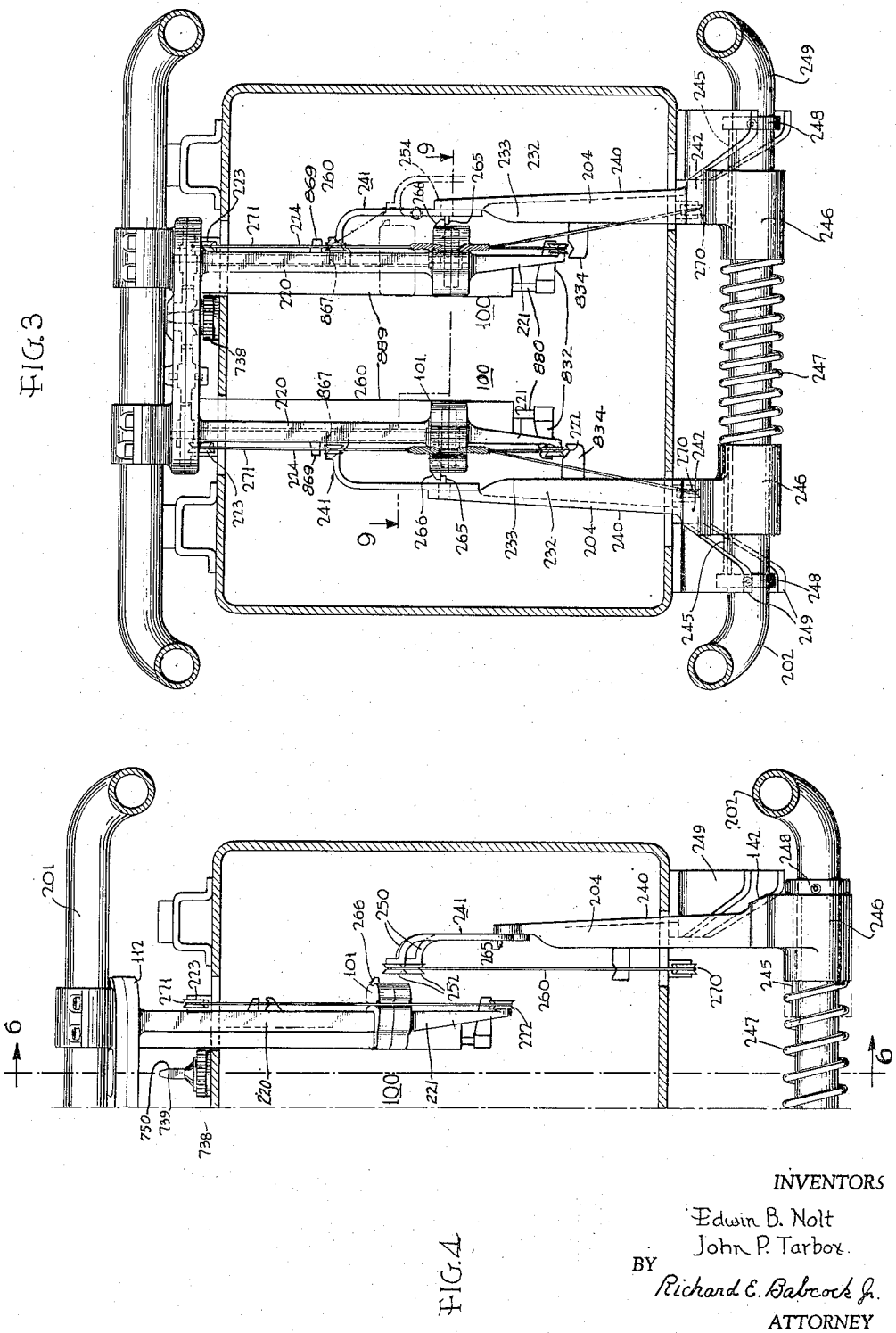

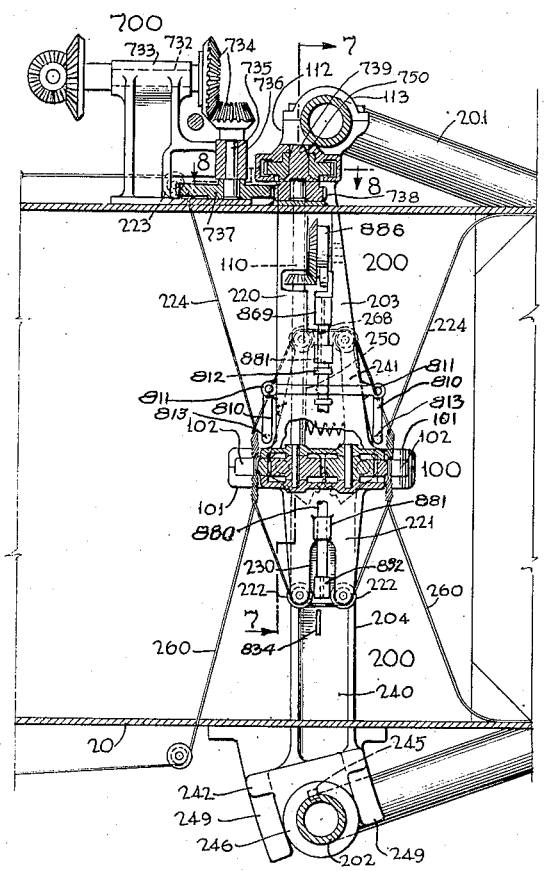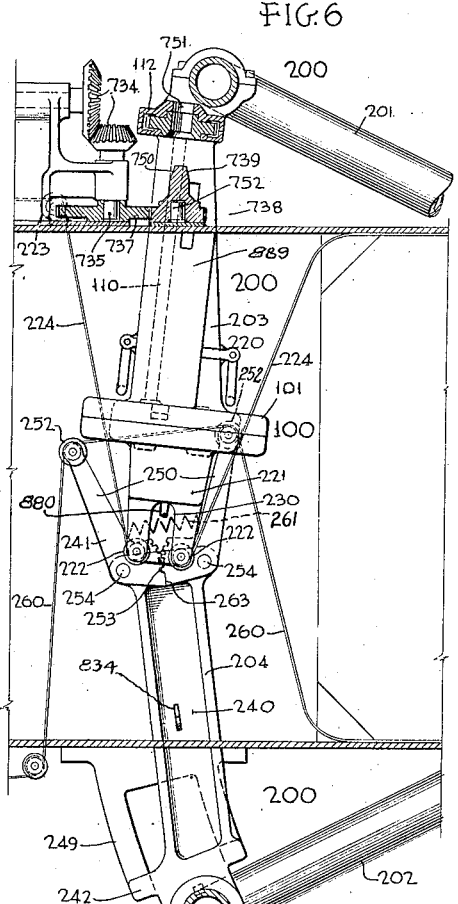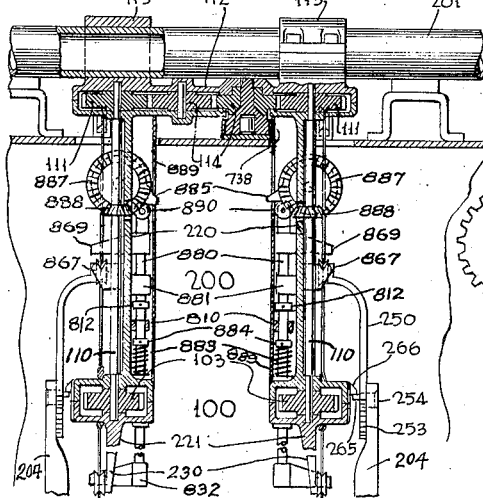

INVENTORS
Edwin B. Nolt.
John P. Tarbox.
BY Richard E. Babcock Jr.
ATTORNEY

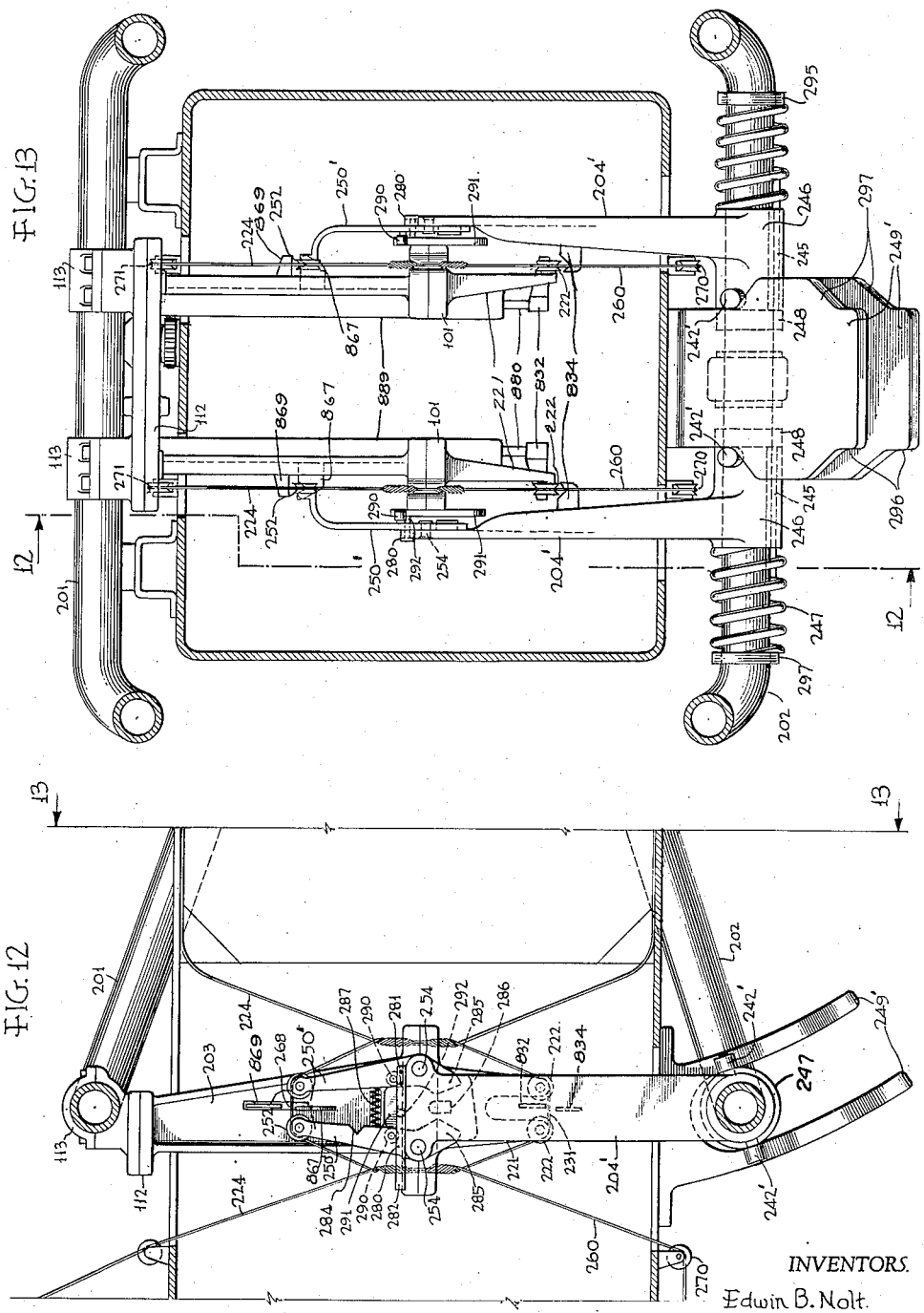

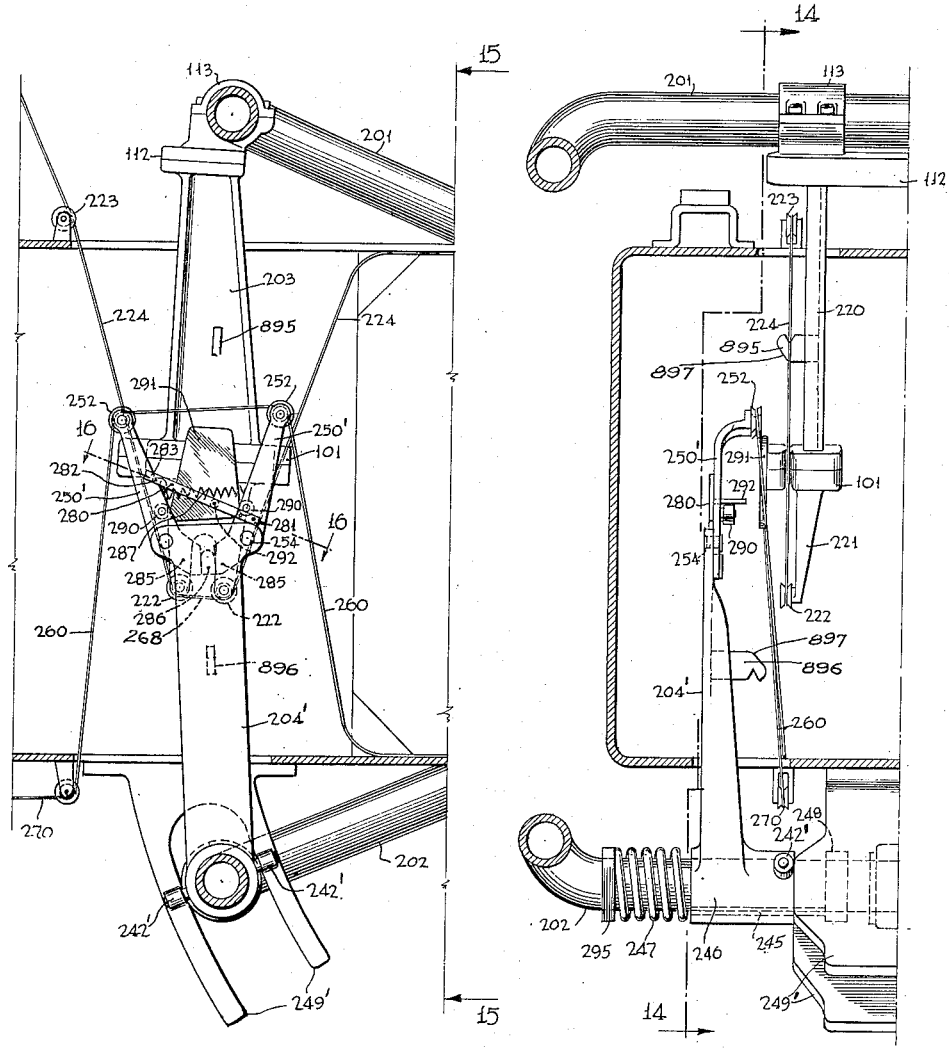
FIG. 14
FIG. 15
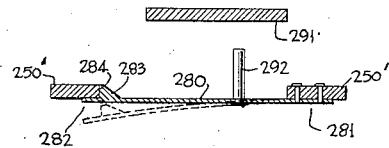
FIG. 16
INVENTORS
Edwin B. Nolt
John P. Tarbox.
BY Richard E. Babcock Jr.
ATTORNEY

United States Patent Office 2,777,384
Patented Jan. 15, 1957

2,777,384

TWO-SPOOL NEEDLE-BORNE TIER

Edwin B. Nolt, New Holland, and John P. Tarbox, Philadelphia, Pa., assignors, by mesne assignments, to Sperry Rand Corporation, New Holland, Pa., a corporation of Delaware Application March 9, 1953, Serial No. 341,055

8 Claims. (Cl. 100—11)

Our wire tying mechanism for automatic balers, the subject of this invention, is outstandingly characterized as an end of the bale tier utilizing two spool strands per tie and effecting a double twist wire joint at each end of the bale through the use of power driven needle borne wire twisters. It is in this latter aspect especially that it is to be distinguished from the invention of our co-pending application Serial No. 317,628 of October 30, 1952, in which power operated twisters are plunger-borne.

The outstanding object of our invention is simplification of the mechanism at large with resultant decrease in the cost of manufacture, simplification of operation, and improvement in each durability, reliability and efficiency.

These objects are attained largely through the adaption of needle-borne twisters as distinguished from plunger-borne twisters, but the utilization of the needle movements to achieve the wire lay in the twisters during and by virtue of the movement of the needles and twisters into the tying position also contributes substantially to the achievement. The lay of the strands in the twisters is indeed achieved solely through needle movements and quite independently of twister gear action. Yet another contributing factor is the achievement of the lays and the delivery of the twisted joints from the twisters in the plane of the bale tie itself.

To these ends each needle-borne twister mechanism comprises a pair of twister gears, the one to make the rear joint of the tie about an advanced bale, and the other to make the front joint of the tie about the succeeding bale, which twister gears are arranged, the one with its wire receiving slot facing forwardly and the other with its wire receiving slot facing rearwardly in both the strand receiving and joint delivery positions, both slots lying in the common plane of the spool strands and the completed tie about the bale. Accordingly, when the needle bearing the twister mechanism enters the bale case the strands of the needle loop automatically enter the twister gear slots. We make the path of the points of the coacting needles such that the strands of the loop which it forms are brought into the same plane, entered into the same slots and superimposed upon the strands of the other loop. We utilize the existing tension in the spool strands as created by the needles themselves during the formation of the loops to strip the joints from the twister mechanism when the bights of the loops are cut apart following the completion of the joints.

In the accompanying drawings we show those embodiments of our invention with which we are acquainted at the time of writing this specification. The principal embodiment is that shown in Figs. 1 to 11, the other is that shown in Figs. 12 to 15.

Fig. 1 is a longitudinal vertical section of the mechanism of our invention at large as mounted upon a bale case. The mounting portion only of the bale case is shown. The parts of the mechanism and the plunger of the baler are shown in those relative positions which they occupy when the mechanism has just completed a tie, but has not cut the strands apart.

Fig. 2 is a top plan view of the mechanism at large showing the parts visible in such a view in the same general relationship as in Fig. 1.

Fig. 3 is a vertical transverse section taken on line 3—3 of Figs. 1 and 2, looking in the direction of the applied arrows.

Fig. 4 is a sectional elevation corresponding to the right hand half of Fig. 3 showing the needles not all the way in, but most of the way in, with the point of the lower needle just passing the twister gears carried by the upper needle.

Fig. 5 is a sectional side elevation on line 5—5 of Fig. 2, showing the power drive gears in section, and one pair of needles in elevation with the needle borne twister gear housing broken away to reveal the gears in section.

Fig. 6 is a view similar to Fig. 5 but showing the parts in the relations they occupy in Fig. 4, substantially a section on line 6—6 of Fig. 4.

Fig. 7 is a section on line 7—7 of Fig. 5, showing needles, twister gears, and power driving gears in transverse section.

Fig. 8 is a section of the power drive gearing on line 8—8 of Fig. 5, in a horizontal plane of division of the drive gear housing carried by the upper needle yoke and showing in plan the relationship of the gears carried by the yoke to the source of power on the one hand and the needle borne twister gearing on the other.

Fig. 9 is a section on line 9—9 of Fig. 3, showing in top plan and in horizontal gear housing section the gears of the needle borne twisters.

Fig. 12 shows in side elevation the needles of the modified form of our invention, the view being taken on line 12—12 of Fig. 13 following.

Fig. 13 is a transverse section of the modified form, a view from 13—13 of Fig. 12 corresponding to Fig. 3 of the principal form. In both Figs. 12 and 13 the positions of the parts are those they occupy just upon the completion of the wire twists as in the instances of Figs. 1–3.

Figure 10:
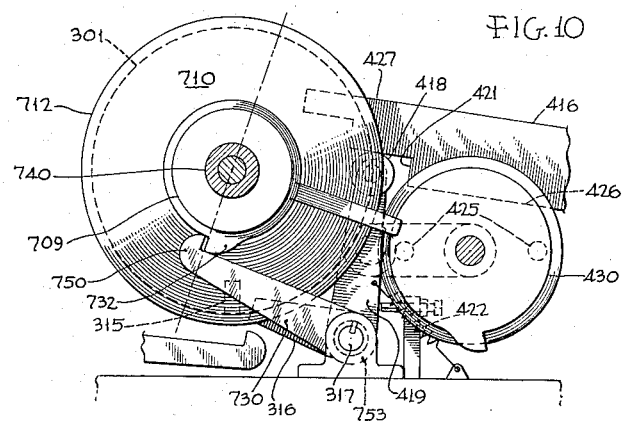
Fig. 10 is a section of the timer and needle drive mechanisms on line 10—10 of Fig. 2, showing the timing clutch control elements in the relative positions they occupy after the loops have been completed and just before the twists are to commence. Certain twister clutch control elements are omitted for clarity.

Figs. 14 and 15 are respectively longitudinal and transverse sections on lines 15—15 and 14—14 of each other, views of the needles of the modification part way in only, the points of the lower needles just passing the twister gears carried by the upper needle.

Figure 16 is a somewhat enlarged detail section on the line 16—16 of Figure 14.

In describing our invention, we shall use the same system of numbering utilized in our copending application above referred to, utilizing numerals of a different 100 series to apply principally to each different mechanism of the tire. Numerals of the 100 group apply to the twister mechanism per se; numerals of the 200 group apply to the needle means per se, particularly to the needles and their mounting; numerals of the 300 group apply to the primary timing mechanism having to do especially with the control of the needle movement; numerals of the 400 group apply to the metering device, the central element of which is the metering wheel in this case; numerals of the 500 group apply to the plunger-latch mechanism of the baler; numerals of the 600 group apply to the needle drive; and numerals of the 700 group apply to the power drive for the twister. Numerals below 100 apply to parts of the automatic baler other than the wire tier per se, such as the bale case and plunger.

Referring now to Figs. 1 and 2, the bale case per se is designated generally 20. It is rectangular in form and comprised of the bottom and top plates 21 and 22 and side plates 23 and 24. In the top and bottom of the casing respectively are provided elongated slots 25 and 26 through which the needles of the mechanism may be projected and withdrawn together with the parts which they bear. These slots may or may not have forward extensions (not shown) exposing part or all of the longitudinal reach of the wire of the tie for the bales to minimize or regulate the friction drag of the wire within the case, and to prevent or minimize wear of the case by the wire.

Within the case reciprocates the plunger 30, generally outlined and located in dotted lines especially in Figs. 1 and 2. Reciprocation is from a source of power (not shown) by way of a connecting rod or pitman 31, also generally shown by dotted lines. The head of the plunger and the plane it occupies in its extreme forward standstill position (it actually moves a little farther forward before being locked out) is marked 32. Its rear end extensions are marked 33. It is provided with the usual needle and wire receiving slots 34 in its main body (see Fig. 2 especially). While closed to the rear these needle receiving slots are open through the front wall 32 in accordance with the usual practice. The usual corner extensions 35 flank slot 34 at their upper and lower extremities.

Two pairs of needles are used, providing for two ties per bale. Twisting mechanisms 100 (see especially Figs. 1 to 3) are carried by the upper needles of the pairs. They are rigidly connected with the main body of the needles through the gear housings 101 in such position on the needles that when the needle is projected all the way into the casing the gears of the mechanism lie substantially in the horizontal medial plane of the bale case, substantially midway between the top and the bottom. Each twister mechanism 100 comprises four gears in longitudinal series meshed together to be commonly driven (see Figs. 5 and 9). The two endmost designated 102 are the slotted twister gears per se. When the gears are idle their slots lie in the plane of the tie to be made about the bale, that of the forward gear facing forward and that of the rearward gear facing rearwardly. The gear housing 101 is of course slotted complementally as usual. The two intermediate gears 103 are somewhat larger than the twister gears per se, 102, and have their axes in a plane inwardly offset toward the center of the bale case from the axes of the twister gears 102 to provide better clearance for the coacting lower needles past the outer sides of the gear housing 101 and to avoid interference by the vertically extending drive shafts of gears 103 with the bights of the needle loops.

A single drive shaft 110 (see Figs. 1, 7, 8 and 9) is provided for each twister mechanism. This shaft emanates from the rearward intermediate gear 103 and extends vertically, paralleling the main body of the needle which bears the twister mechanism, and terminates in a drive gear 11 journaled in a gear housing 112 carried by the needle yoke 201. The housing 112 is clamped to the needle yoke by separate members 113. Within the housing are two intermediate gears 114 which mesh with each other and gears 111, whereby both twister mechanisms 100 can be driven together and in synchronism.

The needle means 200 embodies and its fundamental components as usual the needle yoke and the needle. In this type of mechanism however, instead of there being provided one needle yoke and two needles (for two ties per bale), there are provided two yokes an upper 201 and the lower 202 and four needles, a pair of upper needles 203 and a pair of coacting lower needles 204. The form of the yokes 201, 202 is quite conventional. They are U-shaped, having sides journaled at 210 upon the sides 23 and 24 of the bale case and having bight portions reaching across the top and bottom of the casing respectively. On the other hand the needles themselves are very unconventional differing in each; form, construction and operation from conventional needles.

First let us examine the upper needles 203. Their main bodies 220 are preferably in the form of castings of a light strong alloy integrally formed with gear housing 112 carried by the yokes 201 and likewise integral with the housings 101 of the twister gears 102, 103 (see especially Figs. 5 to 7). The gear housings 101 and 112 of course will be appropriately split and the parts bolted or riveted together to permit assembly of the gears which they contain. The points of these needles are comprised of downward extensions 221 from the gear housings 101 which lie just inwardly toward the centre of the bale case from the vertical plane in which the axes and slots of the twister gears 102 lie, and wire engaging rollers or pulleys 222 carried at the extremities of these extensions and lying in the plane of the axes and wire receiving slots of the gears 102. Thus the pairs of rollers 222, when the upper needles are projected through the bale case slots 25 into the bale case, will engage the spool strands and project them into the bale case in the form of an extended loop. The spacing between the rollers of each pair 222 at a needle extremity and the spacing between the rearward extremity of a completed bale and the nearest guide roller 223 of a spool strand is such as to give the sides 224 of a wire loop so projected an inclination of such decreasing divergence with the progress of the needle downwardly as will bring the sides of the loop into and to the bottoms of the wire receiving slots of twister gears 102 and firmly seat them on the bottoms of the slots when the needle and twister gears, which it carries, come to rest. (See Fig. 6.) The sides 224 of the wire loop commence to enter the slots of gears 102 so soon as the twister gear housing 101 in its descent reaches said sides 224, and the lay is progressively completed as the housing 101 goes toward its position of rest in the medial plane. Preferably the strands bottom in the slots somewhat before the medial plane is reached, in order to insure bottoming irrespective of slight variations in bale end firmness, possible lost motion in the mechanism at large, or other discrepancies.

The extensions 221 carrying the needle point rollers 222 are openly forked at 230 whereby the bight portion 231 of the wire loop is freely exposed. This is for the purpose of permitting the cutter blade 834 mounted on the after needle 204 to reach through to the bight 268 as the lower needle 204 moves upwardly and to coact with blade 834 carried by needle 204, whereby the bight is severed. (See Figs. 5 and 7.) The mechanism for operating the cutters will be described presently.

The lower needles 204 also have their main bodies 240 fabricated of high strength light alloy castings. However they carry no gears or gear housing and their point portions 241 are non-integral with the main body and very differently constructed. However the main bodies 240 instead of being fixedly secured to the lower needle yoke 202 are adjustably keyed thereto for limited transverse movement toward and from each other by key means 245 associated with the mounting collars 246 (Fig. 3) which latter encompass the bight yoke. Normally the collars 246 are pressed apart by the intervened spiral spring 247 surrounding the bight of the yoke and lie against the adjustable limiting collars 248 encircle the bight of the yoke outside of them. This condition obtains when the needles are in retracted position, withdrawn from the casing. When, however, they are projected all the way into the casing to make a tie, forked cams 249 projected from the bottom of the casing engage follower lugs 242 of the sleeves 246 and move them toward each other a predetermined distance. See Figs. 3 to 6.

The points 241 of the lower needles are comprised of a pair of scissors-like levers 250 symmetrically arranged and pivoted to the main body 240 with respect to the transverse plane of symmetry 251 of needle bodies 240. Their pivots 254 are near their lower ends. They point upwardly and terminate each in a wire engaging roller 252. They are geared together by meshing teeth 253 arranged on arcs about their pivots 254 so that they will swing in unison about their pivots without disturbance of symmetry with respect to plane 251. When swung toward each other as shown in full line, their upper extremities and rollers 252 lie close together and lower wire loop 260 formed by the lower needle is of substantially the same form as the upper wire loop 224 formed by the upper needle 203. However, the levers 250 are normally biased by an intervened spiral spring 261 and occupy the full line positions shown in Fig. 6. Heel portions 263 abut each other when the levers are in this spread-apart relation and limit the spread. The approach of levers 250 toward each other and to the full line position is brought about by the engagement of a pin 265 (see Figs. 3 and 4) carried by one lever with a projection 266 from the twister gear housing 101. The degree of approach is limited by the degree of needle movement and this of course is fixed by the fixed needle stroke.

A relatively fixed cutter blade 867 is carried substantially in the plane of symmetry 251 of the twister 100 from the main body 220 of the upper needle. Its lower side is inclined upwardly from its base and it lies in a position to enable the bight 268 of loop 260 when the needles are approached to take a position below it. In such position it is to coact with movable cutter blade 869.

The means for operating the movable cutter blades is carried by and operated from the upper needles 220. Each of them comprises the vertically reciprocable rod or shaft 880 borne from the back side of the needle bodies by upper and lower bearing ears 881. Lower and upper movable blades 832 and 869 are rigidly connected to the body of the rod and project respectively through opening 230 at the point of the needle and slot 882 in the upper body. Rod 880 is biased upwardly by compression spring 883 between housing 102 of the twister mechanism and collar 884 on the rods. The rod passes through the housing of the twister mechanism at this point. The rod is operated downwardly to coact blades 832 and 869 with relatively fixed blades 834 and 867 by the knob 885 of a cam member 886 in the plane of the rod and its blade, which knob engages follower 890 at the top of the rod. Cam 886 is revolved once for each complete operation of twister mechanism 100 by a bevel geared reduction connection 890, 888 with twister operating shaft 110. Knob 885 comes around and into engagement with follower 887 just as the last twist of the joint is being completed, so operating the cutters to sever the bights 268 of the needle loops just before the last twist of the two joints is completed. The cutting mechanism at large so arranged is provided with a metal enclosure housing 889 secured to the rear of the needle bodies in any suitable manner.

Bell crank joint stripping levers 810 borne in bearing ears 811 on the opposite sides of the needle body have their horizontal arms extending on opposite sides of rod 880 and in the path of a collar 812 borne by the rod above them in such position that as the cut is completed lateral bell crank extensions 813 from the lower ends of the vertical arms into the plane of the needle loops and lying normally inside of the twisted joints, are borne outwardly against the joints and strip them from the twister slots 102 of the twister mechanism 100.

Now both the twister mechanism 100 and the needle means 200 are controlled and powered from a primary timing mechanism 300 constructed and arranged in detail substantially as is the primary timing mechanism disclosed in the co-pending application of joint inventor Nolt, Serial Number 268,424 filed January 26, 1952. Because fully disclosed in this co-pending application and also generally described in the co-pending application number 317,628 filed October 30, 1952, of the applicants hereof, this mechanism is but shown in outline herein. Its central element comprises a one revolution and stop clutch 301 consisting of driving element 302 and driven element 303. Driving element 302 constitutes the casing of the clutch and is revolved continuously by a sprocket 304 geared by sprocket chain 305 to the same source of power (not shown) which drives the plunger 30 through the pitman connection 31. Driving element 302 of the clutch therefore, rotates in a fixed timed relationship to the reciprocation of the plunger 30, and the twister mechanism 100 and the 200 needle mechanism controlled and driven from it can therefore be driven and controlled in such relationship to the plunger reciprocation as is necessary in bale tying.

Driving element 302 of the clutch revolves about a through running shaft 310 supported from the top of the bale case in bearing 311 borne from brackets 312. The driven element 303 of the clutch is keyed to this shaft 310 with the result that when the clutch is in engagement, element 303 drives this shaft. Engagement and disengagement of the clutch is brought about as in the copending application of Nolt et al. by the release or retention of the clutch controlling detent 315 which in turn governs the movement of the driven dog of the clutch mounted within the driven member 303 in such manner that when detent 315 is released this driven dog is engaged by the mating driving member 302. Dog 315 is normally retained against rotation and in clutch disengaging position by a pivoted retaining arm 316 against the outer end of which it bears when driven member 303 is at rest. Arm 316 is pivotally borne on an oscillatable shaft 317 in turn supported from the top of the bale case in bearings 318.

While the timing of the tie in relation to the position of the plunger is controlled by this primary timing mechanism 300 its occurrence in relationship to the length of the bale being formed is determined by the metering device 400 which exercises control over the retaining arm 316. This metering device 400, as in our copending application above referred to, comprises metering wheel 410 borne from bale case in bearing 411 and engaging the bale through slot 412 on the top of the case; excentric pin 415 on the metering wheel push bar 416, having a shouldered rear end 421, arm 419 keyed to the shaft 317 which bears arm 316 and bearing follower 418 at its upper end. (See Fig. 10.) While the bale is being formed, bar 416 rests on top of the follower 418 through its rearward extension 427, with shoulder 421 in front of, that is to say, to the right of follower 418. As the bale progresses toward completion shoulder 421 engages the follower 418 and moves it rearwardly thereby oscillating shaft 317 and arm 316 counterclockwise to move its end downwardly and away from detent 315 thereby releasing the detent and bringing about engagement of clutch 301. The clutch revolves counterclockwise one revolution when it is stopped by mechanism connected with needle drive presently to be described.

Also engaging with the detent 315 is the upwardly hooked end of an arm 501 pivoted on an axis shaft 502 associated with the plunger latch mechanism 500. This axis shaft 502 is borne in bearings 503 from the top of the bale case. Plunger latch mechanism 500 as in our co-pending application above referred to, comprises a latch per se 510 having front end 512 and front extension 513 engaging with the rear end 33 of the plunger and the top of the bale case respectively: latch arm 516, latch spring 515, spring tensioning arm 517 keyed to shaft 502, bell crank arm 518, cam roller 520 and roller operating cam 521 borne on the upper side of the plunger 30, together with latch release rod 525 connected to latch arm 516 through joint 526 and bearing abutment 528 together with latch release arm 529 and its mating arm 530 loosely pivoted in bale case brackets 531, and release spring 532 extending between the bale case and extension 533 of release arm 529 and biasing the arm toward abutment 528. The entire arrangement is essentially similar to that of our co-pending application already referred to. However, the means for operating arm 529 through the follower 534 of arm 530 is somewhat different and is presently to be described. It is associated with the needle drive mechanism 600.

Needle drive mechanism 600 comprises needle drive shaft 610 borne from the top of the bale case in bearings 611 and provided at each of its opposite ends with a crank arm 612 which connects by means of pitmans 614 with complemental crank arms 613 joined to the upper needle yoke 201. Upper yokes 201 on each side of the bale case are provided with segmental geared connections 620 (Fig. 1) with the lower yoke 202 whereby the yokes move in unison in opposite directions when they are actuated. Actuation is by means of the two to one geared connection 630 between the driven element 303 and driven shaft 310 (of the one revolution and stop clutch 301 of the timing mechanism) and the needle shaft 610. With this two to one gearing 630, for each single revolution of clutch 301 of the timing mechanism needle shaft 610 will make one-half revolution, thus driving yokes 201, 202 respectively toward or away from the bale case and driving the needles borne by the yokes into or out of the bale case.

Thus also for each half revolution of needle shaft 610, one of the pins 425 carried diametrically opposite each other on shaft borne disc 430, will engage with the under side 426 of push bar 416 of the metering mechanism 400 to lift the push bar and release follower 418 from confinement by shoulder 421 and so permit spring 422 to swing arms 419 and 316 clockwise, again to place arm 316 in the path of detent 315, so the stop clutch 301 at the close of the revolution. Thus also after needle shaft 610 has completed two half revolutions, follower 534 on arm 530 of the plunger latch mechanism will again enter notch 535 in disc 536 and permits spring 532, acting on arm 529 through extension 533, to push rod 525 through abutment 528 to raise latch 519.

The power drive for the twister mechanism 100 is denominated generally 700. It comprises a slip clutch 710 made up of driving and driven elements 711 and 712, organized about driven shaft 310 of timing mechanism 300 and constructed in detail as are the elements of the twister clutch disclosed in our co-pending application 317,628 and controlled likewise in substantially the same manner from the needle drive shaft 610. As in the former case a bell crank 714, 716 connected together and loosely journaled by sleeve 753 on same shaft 317 which carries the arm 316 controlling clutch 301, is acted upon by cam 718 carried by cam disc 717 to release and then reengage clutch dog 713 within one revolution of the driven member 712 of clutch 710, thereby constituting clutch 710 like clutch 301 a one revolution and stop clutch. As in the former case too, the cam 732 borne by sleeve 709 projecting axially from the driven member 712 acts upon an arm 730 keyed to shaft 317 to rock shaft 317 counter-clockwise just before driven member 712 completes the revolution which has been permitted it by release of dog 313, so releasing detent 315 of clutch 301 and permitting it a second revolution to withdraw the needles from the bale case.

The revolution of clutch member 712 supplies the power for driving twister mechanism 100 by way of sleeve 709, its concentric extension 740, bevel gears 731 connected respectively with extension 740 and the forwardly extending shaft 732 in journal 733 founded upon the top of the bale case, bevel gears 734 respectively on the forward end of shaft 732 and on the top end of a short vertical shaft 735 (Figs. 5 to 7) in a journal 736 also founded on the bale case, by way of gear 737 at the lower end of shaft 735 to a mating gear 738 journaled from the bale case on stub 752 and carrying an upwardly extending stub shaft 739, which shaft 739 is provided with a squared and upwardly tapering upper end 750 (Fig. 8) which enters a complementally squared central hole 751 in one of the two intermediate gears 114 (Figs. 5 to 8) in the housing 112 carried by the upper needle yoke 201, whenever the needle yoke 201 is at its extreme downward movement and needles 203 are all the way in. Gears 737 and 738 may be journaled in a housing seated upon the bale case.

The operation is simple. Normally of course both the upper needles 203 and the lower needles 204 will occupy positions entirely outside the bale case 20, but with their respective points bearing strand engaging rollers 252 and 222 just outside and in the planes of the upper and lower wire strands which are being drawn from the spools longitudinally of the top and bottom of the case as the bale is being formed. All of this is as usual and needs neither explanation nor illustration save in respect to the fact (as clearly appears in Figs. 3 and 4) that the lower main strands 270 lie in vertical planes displaced laterally outwardly from the vertical plane of the upper main strands 271 and the points of the lower needles lie in these outer planes and initially engage the strands 270 in those planes as the lower needles are entered in the case. The lower needles 204 are maintained in these normal positions by the spring 247 which normally presses their yoke-mounted collars 246 against the fixed but adjustable collars 248.

The needles being just outside the bale case at the time a given bale is completed, the metering wheel 410 of metering device 400 trips the one revolution and stop clutch 301 of primary timing mechanism 300 to make its one revolution and stop. This it does because shoulder 421 in progressively moving follower 418 rearwardly, swings arm 316 downwardly to release detent 315, thereby to engage the driving and driven members of the clutch, and because shaft 610 of the needle drive mechanism which is revolved by clutch 301 through the two to one gearing 630 promptly engages one of the two pins 425 (see Fig. 10) with the under side of metering bar 416 to lift the body of the bar to place shoulder 421 above follower 418, whereupon follower 418 is swung forwardly by spring 422 to replace arm 316 in the path of the now revolving detent 315, so that clutch 301 is reopened immediately, its first revolution is completed and shaft 610 driven from it, comes to rest. Such operation is described in detail in the co-pending applications above referred to.

The one-half revolution of the needle drive shaft 610 carries needles 203, 204 from their positions outside the bale case into the relative positions shown in Figs. 1, 3, 5 and 7 by way of the intermediate positions shown in Figs. 4 and 6. As the needles enter the bale case the rollers 222 and 252 at their points 221 and 241, engage the main strands 271, 270 and carry them into the case in the form of wire loops 224 and 260. Shortly after the twisters 101 carried by the upper needles 203 enter the bale case the sides of the upper wire loop 224 enter the slots of the twister gears 102 through the complemental slots in the gear housing (Figs. 4 and 6) and as the needles approach their extreme innermost positions, are bottomed in these slots thereby completing the lay of the strands of the upper loop. This lay is preferably completed before the point 241 of the lower needle 204 reaches and passes the twister mechanism 100 as in Fig. 6. The lower loop 260 is initially much wider than the upper loop 224, enough wider to permit the sides of the loop to pass outside of the twister housing 101. This is because the arms 250 are held apart by the considerable tension of spring 261 and abutments 263 are retained in engagement against the tension of loop 260 until pin 265 is engaged by lug 266. Just after the rollers 252 of the point 241 pass the top of the gear housing 101 cams 249 engage lugs 242 projecting from the needle mounting sleeves 246 and move needles 204 toward each other (Fig. 3) thereby to carry the bight of the lower loop 260 toward and past the plane of the upper loop 224 sufficiently to lay the sides of this lower loop 260 also into the slots of twister gears 102. This lay of the loop strands is effected by the approach of the rollers 252 toward each other which is brought about by the engagement of projecting pin 265 carried by the one arm 250 of the point 241 with the projecting lug 266 carried by the housing 101 which, aided by the tension in the loop 260, rotates the arms 250 of point 241 toward each other against the considerable tension of spring 261 through the intermediary of the inter-meshing gears 253. Thus the initially widely spaced sides of loop 260 (spaced widely enough apart to admit the width of the gear housing 101 between them as cams 249 move needles 204 toward each other), is narrowed and the strands of loop 260 are converged and thereby brought into the slots of the twister gears 102 on top of the strands 224 previously laid there. The relative positions of the parts are then those shown in Figs. 3, 5 and 7 save that the wires are twisted together as appears in these figures and in Fig. 1.

Figure 11:
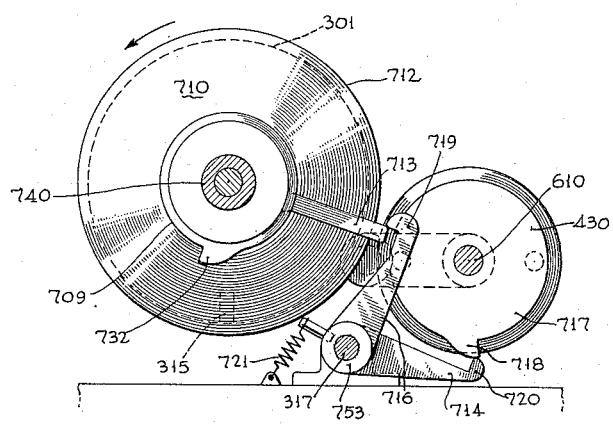
Fig. 11 is a similar view in which the omitted twister clutch control elements are supplied, while certain timer clutch elements are omitted.

In these figures and Fig. 1, the strands are shown twisted together, those on the right (forward) forming a joint to be collapsed on the rear end of the bale, and those on the left to form a joint to be engaged by the forward end of the succeeding bale. This twisting to form the joint is brought about by a rotation of the twister gears which takes place immediately that the needles have reached their innermost positions, those illustrated in Figs. 1, 3, 5 and 7. This is by reason of the fact that upon reaching their innermost positions the twisters 101 have been coupled to the twister drive mechanism 700 by means of the coupling 739, 737 (Figs. 5 and 7) and the fact that the twister drive 700 is at this juncture set in motion to drive the twisters through a determinate number of revolutions, that number to produce the twist desired. It is so set in motion because as the needle drive shaft 610 completes its first half revolution, that which drives the needles to their innermost positions, cam 718 driven from shaft 610 (see Figs. 10 and 11) engages arm 714 of bell crank 714, 716 and withdraws the hooked end of arm 716, 719 from the lug 713 of the twister drive clutch 710 momentarily, thereby to permit that clutch to make its prescribed single revolution and stop, for immediately after releasing clutch 710 and just as needle drive shaft 610 comes to rest cam 718 slips past the hooked end 720 of arm 714 and permits spring 721 to draw the hooked end 719 again into the path of lug 713. This action is described in detail in copending application Serial No. 317,628 above mentioned. The revolution of clutch 710 multiplied through the gear frame 731, 735, 737, 738 and 103 effects the desired number of twists. As the last portion of the last twist is made, cam knob 885 of the cutting mechanism engages follower 890 on rod 880 and operates the cutting blade to sever the bights 268 of the respective loops. The knob 885 passing the follower, spring 883 returns the rod 880 and the cutters to normal position. With the severing of the bights, the joints are freed to fall from the gear slots under the urge of the tensions then in the strands which they join, that on the right to the rear end of the finished bale and that on the left to a free stretch across the bale case.

The twists being completed and the bights cut apart, withdrawal of the needles follows immediately for the last few degrees of movement of the twister drive clutch 710 (follow Figs. 10 and 11 again) will have ratcheted cam 732 past the hooked end 750 of lever 730 once more to rock shaft 317 and arms 316 counterclockwise to again release detent 315 and permit the main timer clutch 301 to make a second revolution and stop. It makes this revolution and stop because the hooked end 750 having been passed by cam 732 just before clutch 710 is brought to rest by the reengagement of lug 713 with the end 719 of arm 716, arm 730 is free to return to its normal position under the urges of spring 422. Shaft 610 of the needle drive mechanism being thereby driven through the remaining half of its revolution, retracts needles 203, 204 to their normal positions outside the case. The second of the pins 425 comes into play in this operation once more to raise metering bar 416 to remove its shoulder 421 from follower 418 and permit spring 422 to bring arm 316 into the path of detent 315 and so bring the tying mechanism completely to rest until the next ensuing bale has been metered to its correct length by mechanism 400.

As the lower loop is severed and the lower needle is withdrawn the arm 250 comprising the points 241 will immediately be separated by the considerable tension of the compressing spring 261, for no longer are the joints drawn toward each other by the tension of the loop 260 and the engagement of pin 265 and lug 266; and the cams 249 will permit needles 204 to move outwardly under the urge of spring 247 and clear the rollers 252 from the rear housing 101 as they pass it.

The underlying principles, the general construction and the mode of operation of the modification of the Figs. 12 to 15 are essentially the same as those of the form first described, that of Figs. 1 to 11. The several structural differences which constitute the modification are brought about largely by the fact that the upper and lower strands of the completed ties lie in parallel vertical planes instead of in planes slightly offset from each other, as in the first form, and in the fact that the tension in the lower wire strand as the lower wire loop is formed by the lower needle is alone utilized to make the lay of the lower strand into the twister in lieu of a gearing between the needle point arms 250 operated through an engagement with the upper needle.

Having particular reference to Fig. 13, first it will be observed that the upper and lower spool strands 271 and 270 and the upper and lower strands 224 and 260 lie in parallel vertical planes, that the lower strands of the ties are not offset laterally outwardly from the upper such strands. Secondly it will be noted that there are no segmental gear teeth 254 between the needle point arms 250 (Figs. 12 and 14) and no pin 265 engaged by a part carried by the upper needle 203 such as the lug 266 (Figs. 3, 4 and 7). Instead, the arms 250' are normally held spread apart to spread the sides of loop 260 apart a distance greater than the width of the twister gear 101 by means of a strong leaf spring 280 fixedly secured at its one end 281 to one arm 250 and releasably engaging the other arm 250' at its other end 282 through the intermediary of a latch 283 engaged in a notch 284 on the inner margin of this other arm 250. This latch spring 280 not only holds arms 250' outspread but holds their lower extensions 285 against a centering projection 286. An intermediate compression spring 287 of relatively light tension (as compared with the spring 261 of considerable tension which holds arms 250' apart against considerable tension of loop 260 in the first modification) also aids in this.

When loop 260 is brought into the plane of loop 224 to make the lay of its strands in the twister, two cam rollers 290 borne respectively by the arms 250' are brought into this plane and into engagement with the sides of plate-like cam 291 secured to the adjacent side of the gear housing of the upper needle. Simultaneously a pin 292 projecting toward the plane face of the plate-like cam 291 is engaged with this face thereby removing its latching end 283 from notch 284 in the engaged arm 250', so releasing the arms 250 to be freely moved toward each other by the existing tension in the loop 260 subject only to the regulation of this movement by the engagement of cam rollers 290 with the converging sides of cam 291. Thus as the needles approach their extreme inner positions the rollers 290 ride upon the converging sides of cam 291 and permit the rollers 252 to be approached toward each other under the tension of loop 260 and against the relatively light tension of spring 287 and so lay the strands of the loop in twister 101.

Upon the shutting of the loop following the twisting of the joints, arms 250' are again spread apart by spring 287 and again latched by latch spring 280 in their outspread positions (for latch 283 rides freely over arm 250' to its latching position by reason of its inclined under face) and the arms and rollers 252 are so made ready to form another wide loop 260 when the next bale is completed.

The form and arrangement of springs 247', cams 249' and cam followers 242' is somewhat different from that in the first modification. Cams 249' are centrally arranged instead of laterally arranged and have their follower-engaging sides shaped to engage the followers 242' first to move the needles laterally outwardly and thereafter to permit them to be moved by springs 247' laterally inwardly, the followers 242' are in the form of rollers instead of lugs, and the springs 247' are divided into two parts, outwardly located, the one pressing the one needle bearing sleeve 246 against its cam and the other similarly engaging the other sleeve 246. The two springs are confined by relatively fixed but adjustable collars 295 on the yokes, while collars 248' which define the normal positions of the needles upon the yokes are located between the needles. The positions of the collars 248' as clearly appears in Fig. 13, ensures that the point rollers 252 occupy a normal position in the vertical plane of the wire ties and the spool strands 270, ready to be engaged with the latter upon the initiation of a new tie, and ensures too a position of the followers 242' in line with the entering edges 296 of the now centrally placed cam 249' as the followers engage them in the course of the sweep of the needles into the case. Just before the rollers 252 become juxtaposed to the approaching points 221 of the upper needle 203, cam projections 297 engaged followers 242' to move the points outwardly to bypass the gear housing 101 as shown in Fig. 15, and just after rollers 252 move upwardly past the housing the cam projections 297 permit the followers 242' to be moved inwardly under the urge of the spring 247', thereby to move needles 204' and the loop-bearing rollers 252 inwardly to their normal planes in which they appear in Fig. 13, thereby to make ready for the lay of the strands in the twister. This lay is effected in the final relative movements of the upper and lower needles through the intermediary of the latch and cam control relative movements of the arm 250' in response to the strand tensions of the needle loop 260 as above described.

In this modification the cutting mechanism shown comprises notched cutting blades 895 and 896 borne respectively by the upper and lower needles. Their under sides are inclined as at 897 and they occupy such positions that as the bights 268 and the wire loops react their innermost positions they ratchet on the inclined sides 897 and spring into the cutting notches, laying them in the bottoms or close to the bottoms of the notches. Then immediately retracting movement of the needles is initiated the taut bights are secured. The yielding nature of the corners of the hay bale permits enough retraction to attain the cot, whereupon the points free themselves of the slots 102 of the twisters and fall free, and the further retraction of the needles is unimpeded.

If desired, the cutting mechanism 800 described in connection with the first embodiment may be substituted for the notched cutters.

We claim:

1. In an automatic baler comprising a bale case, a two spool wire tie mechanism comprising a pair of coacting needles engagable with the spool strands and projectable into and out of the bale case respectively from opposite sides thereof, to positions in adjacent planes to form wire loops the corresponding sides of which overlap each other as pairs, a pair of twisters borne by one of said needles for engagement with one of said pairs of overlapping sides, means for projecting and withdrawing the needles, and means for driving the twisters to join the overlapped loop sides together, the twisters when their elements are idle being faced to receive the sides of the loops being formed by the needle which bears the twisters during and by virtue of the formation of the loop, together with means for entering into the twisters the sides of the loop formed by the complemental needle, the last named means comprehending relatively adjustable points on the complemental needle which points normally lie apart sufficiently to pass the sides of the loop they bear transversely past the twisters to adjoin the plane of the loop already entered, together with means to approach the points together after they pass the twisters.

2. In an automatic baler comprising a bale case, a two spool wire tie mechanism comprising a pair of coacting needles engageable with the spool strands and projectable into and out of the bale case respectively from the opposite sides thereof, to positions in adjacent planes to form wire loops the corresponding sides of which overlap each other as pairs, a pair of twisters borne by one of said needles for engagement with one of said pairs of overlapping sides, means for projecting and withdrawing the needles, and means for driving the twisters to join the overlapped loop sides together, the twisters when their elements are idle being faced to receive the sides of the loops being formed by the needle which bears the twisters during and by virtue of the formation of the loop, together with means for entering into the twisters the sides of the loop formed by the complemental needle, the last named means comprehending relatively adjustable points on the complemental needle which points normally lie apart sufficiently to pass the sides of the loop they bear transversely past the twisters to adjoin the plane of the loop already entered, together with means to approach the points together after they pass the twisters, together with means transversely guiding the points in a path which passes the bight of the loop past the twisters without interference therewith.

3. A wire tie mechanism comprising a bale case, a pair of twisters, means adapted to support said twisters within the case for rotation about axes spaced longitudinally of the bale case, said twisters normally being at rest and having radial slots opening away from each other in a common plane extending longitudinally of the bale case, a needle having relatively longitudinally spaced wire supporting points mounted for relative longitudinal movement with respect to the bale case, said points being normally spaced apart a distance greater than said twisters, means guiding said needle for movement into the bale case and beyond said twisters with said points to one side of the twisters, means for thereafter moving said needles transversely of the bale case to position the free ends of said points in a common longitudinal plane with said twister slots, and mechanism for then moving the needle points longitudinally toward each other so that the sides of the said loop of wire will be received in the respective twister slots.

4. A wire tie mechanism comprising a bale case, a pair of twisters, means adapted to support said twisters within the bale case for rotation about axes spaced longitudinally of the bale case, said twisters normally being at rest and having radial slots opening away from each other in a common longitudinal plane of the bale case, a needle having relatively longitudinally spaced wire supporting points mounted for relative longitudinal movement with respect to the bale case, said points being normally spaced apart a distance greater than said twisters, means guiding said needle for movement into the bale case and beyond said twisters with said points to one side of the twisters, means for thereafter moving said needle transversely of the bale case to position the said points in a common longitudinal plane with said twister slots, and cooperating mechanism carried by the needle and twisters, respectively, for then moving the needle points longitudinally toward each other so that the sides of a loop of wire extending around said points will be received in the respective twister slots.

5. A wire tie mechanism comprising a bale case, a pair of twisters, means adapted to support said twisters within the case for rotation about axes spaced longitudinally of the bale case, said twisters normally being at rest and having radial slots opening away from each other in a common plane longitudinally of the bale case, a needle having relatively longitudinally spaced wire supporting points mounted for relative longitudinal movement with respect to the bale case, said points being normally spaced apart a distance greater than said twisters, means guiding said needle for movement into said bale case and beyond said twisters with said points to one side of said twisters, and means for thereafter moving said needle transversely of the bale case to position the said points in a common longitudinal plane with said twister slots.

6. The combination of claim 5 including a needle drive means comprising a one revolution clutch, the clutch being so associated with the needle drive means that successive revolutions of the clutch cause movement of the needle to and from operative position in the bale case respectively, and twister guide means including a one revolution clutch, trip mechanism interconnecting said clutches to cause operation of each following completion of a revolution of the other.

7. The combination of claim 3 which said mechanism for moving the needle points longitudinally toward each other comprises intermeshing gears fixed to the respective points, a pin projecting from one of said gears, and a stationary lug supported by said twisters for engagement with said pin as the needle moves into the bale case.

8. The combination of claim 5 including releasable means for normally maintaining said points in fixed longitudinally spaced relation, and means associated with the twisters for releasing said releasable means as the needle points move beyond said twisters, whereby the tension of a wire loop extending around said points may move said points toward each other and position the sides of said wire loop in the twister slots.

References Cited in the file of this patent

UNITED STATES PATENTS

| | | |
|---|---|---|
| 761,305 | Johnson | May 31, 1904 |
| 1,180,934 | Mottier | Apr. 25, 1916 |
| 1,889,372 | Nolan | Nov. 29, 1932 |